Patented Apr. 3, 1945

2,373,016

UNITED STATES PATENT OFFICE 2,373,016

METHOD OF MAKING MODIFIED CORNSTARCH

Raymond E. Daly and Frederick A. Frankenfield, Chicago, Ill., and Herman H. Schopmeyer, Hammond, Ind., assignors to American Maize-Products Company, a corporation of Maine No Drawing. Application March 25, 1941, Serial No. 385,132

5 Claims. (Cl. 127—70)

This invention relates to modified corn starch and the method of making it and, particularly, to corn starch adapted to give with water a short, clear gel resembling gels heretofore made from root starches.

Corn starch, when cooked in water to give a paste and then set on cooling, produces a gel that is firm but lacks certain desirable features obtainable with other starches. The corn starch gel lacks, for example, the shortness characteristic of arrowroot starch gel and is somewhat stringy. Furthermore, the corn starch gel does not possess the clearness obtainable with tapioca or potato starch.

Even though the cost of corn starch is favorable, its use is restricted for certain purposes requiring the properties of root starches. In food products such as starch puddings, for example, shortness of the gel is desirable so that the finished pudding may not be stringy or glue-like. In certain fruit pie fillings, clarity of gel is important in avoiding an otherwise hazy appearance in the mixture of fruit and starch which is used in the fillings.

The present invention comprises the herein described modified corn starch and the method of making it. More particularly the invention comprises a modified corn starch characterized by shortness and minimized stringiness when in the form of its aqueous gels and making such modified starch by a method which includes treating corn starch with alkali under critical conditions that are carefully controlled so as to produce the desired modification without pasting the starch during the treatment.

In general, the method comprises the treatment of corn starch in an aqueous suspension at a pH that is just below the point of pasting of the starch under the conditions of treatment, separating the resulting modified starch from the remaining liquor, and, preferably, washing the separated starch to remove impurities and back-neutralizing the starch to a pH that is approximately normal for refined starch. The treatment of the starch is effected under substantially non-oxidizing conditions, that is, in the absence of any appreciable concentration of an added oxidizing material such, for example, as one adapted to provide available chlorine.

The proportion of starch in the aqueous suspension treated may be any one that is usual in the commercial treatment of starch with chemicals. Thus, there may be used a suspension of starch of density about 10 to 25° Bé., a starch suspension of density about 21° Bé. being suitable and convenient for the present purpose.

As the alkali to establish the pH at the desired value, there is used one which is so strong and so soluble that it may be added in dissolved form to the starch suspension and in amount adequate to establish the high pH that is necessary for the successful modification of starch in accordance with the present invention. Sodium hydroxide is entirely satisfactory for the purpose and is preferred because of its low price, although another alkali metal hydroxide, particularly potassium hydroxide, is satisfactory except for the cost which is increased unnecessarily by its use. Ammonium hydroxide may be used provided it is used in such concentration as to give the pH of 10 or more required for the present purpose.

In order to avoid temporary over-concentration or localized excess of alkali during admixing the alkali into the starch suspension, the starch suspension is agitated as the alkali is being added and the alkali is added rather slowly in the form of a relatively dilute solution, say one containing about 1 to 5 parts of the alkali for 100 parts of solution, concentrations of 2 to 3 parts of the alkali being advantageous.

The alkali is added in amount to establish the pH at a figure not substantially below 10 or above 12. The upper limit of the pH value is that which may be safely used without pasting the starch.

The period of time during which the suspension is maintained at the stated pH is at least several hours and may run to a day or so, the exact time required varying somewhat with the temperature of treatment and the exact value of the pH used within the range stated. Good results have been obtained in about 5 to 25 hours, 6 to 15 hours being preferred. In general, the treatment for a given set of conditions is continued until the desired modification is obtained, as determined by testing the batch from time to time to learn when there has been produced a starch that, after back-neutralizing, pasting, and cooling, has the desired shortness and clearness in the gel form.

The temperatures used are preferably at or near room temperature or the temperature of the water used in suspending the starch in making the original suspension to be treated. Considerable variation in the temperature is allowable, so long as the temperature is kept safely below the temperature of pasting of the starch at the pH prevailing in the mixture. We have used to advantage temperatures that are below 150° F. and preferably are about 100 to 130° F.

After the starch has been maintained at the critical pH for a period of time adequate to give a modified starch of the characteristics stated, as shown by test made on a small sample of the lot being treated, the starch is then separated from the remaining alkali liquor. This separation may be effected, by tabling in the usual manner. The modified starch, however, separates so slowly from the alkali liquor that tabling is not expeditious. For that reason, the starch is preferably allowed to settle in a tank until nearly all the starch is settled, say for 6 to 24 hours or more.

After the starch has settled and the supernatant liquid has been withdrawn, there appears above and on the settled starch a superficial layer containing considerable gluten materials and the like which, unless removed, would affect unfavorably the color and the quality of the starch. This superficial layer is flushed off with water. The remaining starch cake is then resuspended in fresh water applied to the cake, the resuspension being facilitated in a typical operation by means of a chain agitator including chains which hang from arms extending generally horizontally from the agitator shaft, the chains being dragged on the settled starch and gradually resuspending the starch in the water.

Back-neutralizing of the starch, suitably after settling, washing, and resuspending, is effected by the addition of an acid in amount to give approximately the pH which is desired for the finished modified starch, say about pH that is normal for refined starch. Thus, there may be used a solution of hydrochloric, sulfuric, or like acid and the solution added with stirring to the resuspended starch, in such proportion as to give a pH of about 4 to 9, preferably about 5 to 6.

The back-neutralized modified starch is then separated from the remaining liquor and washed with water, as, for example, in starch washing filters of conventional type. For this purpose an American or Oliver filter is satisfactory and the starch is resuspended in fresh water and re-filtered as many times as necessary to lower the ash content substantially to that of the original untreated starch.

The washed starch is then dried in usual manner, as, for example, with a belt drier, shelf drier, or drying kiln. Since it has not been subjected to the action of any oxidizing or chlorinating agent, the starch is non-oxidized and non-chlorinated.

The finished starch, when cooked, gives a paste which is short and clear. The starch itself is lower in protein and oil and lower in fluidity than was the original untreated corn starch.

The following table shows certain features of a typical corn starch modified as described and also comparable data for the original untreated starch.

| | Untreated corn starch | Our modified corn starch |
|---|---|---|
| Moisture_____per cent | 9.1 | 9.5 |
| Ash_____do____ | 0.11 | 0.12 |
| Oil content_____do____ | 0.50 | 0.30 |
| Protein_____do____ | 0.30 | 0.18 |
| pH_____ | 5.0 | 5.0 |
| Fluidity (outflow from standard opening in cc. per min.)_____ | 78 | 20 |

The fluidity as reported in the above tabulation is determined as follows: Starch is cooked with water in the proportion of 1 part of starch to 17 parts of water to a temperature of about 185° F., in a bath of boiling water. After the temperature reaches 185° F., the resulting paste is cooled immediately to 65° F. and the rate of outflow from a calibrated funnel is noted. The result is expressed in terms of cc. of outflow per minute.

In a typical example of the practice of the invention the following procedure was used. To 10,000 pounds of a corn starch and water suspension of density 21° Bé. there was added gradually, with constant thorough agitation, a 2 to 3% solution of sodium hydroxide in water, the exact amount of the sodium hydroxide solution added being varied somewhat with the type of starch and the kind of liquor in which it is suspended, various wash waters from starch making processes being sometimes used in place of pure water in making the suspension. Regardless of such variations in raw materials, sufficient solution is added to establish the pH at about 11 to 12.

The suspension was maintained at this pH and agitated for 12 hours. The agitation was then discontinued and the starch allowed to settle in the containing tank for 8 to 12 hours.

There was thus obtained in the bottom of the tank a rather compact layer of settled modified starch, with gluten and other impurities that settle somewhat more slowly than starch forming a superficial thin layer or film over this layer. This film is then washed away with fresh water flowed over the settled starch. The starch cake is then resuspended, washed, back-neutralized, and dried, all as described above.

Starch so made, when pasted with water and subsequently gelled, is short, relatively clear, and much lower in protein and oil content than the untreated starch. Also, the modified starch is of somewhat greater fluidity and adapted to replace root starches in puddings, pie fillings, and other uses requiring a short, clear starch gel.

Particularly good results are obtained when the treatment described is combined with a usual process for the thinning of corn starch. From such combination of methods, there is produced a thinned starch that is characterized by remarkable clearness when in pasted condition.

In making this form of starch, the alkali treatment as stated, at a pH of 10 to 12, is applied to corn starch, to give a product of the properties described. Then the product is subjected to acid thinning, as by being acidified to usual pH for acid thinning, say 1.5 to 2.5, heating, adjusting the pH of the thinned starch to produce that desired in the finished starch as, for example, 5 to 7, and washing and drying the product.

For some purposes, the order of the two treatments may be reversed. Thus, the corn starch may be first acid-thinned moderately, as to 10 to 30 thin boiling, then the pH adjusted to 10 to 12, and subsequent modification effected as described above. In this modification of the invention, the acid-thinned corn starch replaces ordinary starch as the raw material to which is applied the modification treatment at a carefully controlled pH that is not substantially below 10.

The starch modified by the combined processes is particularly satisfactory in making clear gum drops and like products.

It will be understood that the details given are for the purpose of illustration and that variations within the spirit of the invention are intended to be included within the scope of the appended claims.

What we claim is:

1. In making modified corn starch, the method which comprises forming a suspension of corn starch in water, adding alkali to the suspension to establish the pH at about 10 to 12, maintaining the suspension under substantially non-oxidizing conditions at about 100 to 130° F. and at said pH for a period of at least several hours so as to produce a non-pasted starch adapted to give with water a short clear gel, then separating the starch in unpasted condition from the alkaline solution present, neutralizing the modified starch to a pH of approximately 4 to 6, and washing the neutralized starch to remove soluble material.

2. In making modified corn starch, the method which comprises forming a suspension of corn starch in water, admixing an aqueous solution of an alkali metal hydroxide while stirring to avoid local excess, the addition of the said solution being discontinued when the pH is established within the range of about 10 to 12, maintaining the pH of the suspension within the range 10 to 12 for at least several hours at a temperature below the pasting point of the starch, settling the treated starch in unpasted condition from the alkaline solution, separating the supernatant liquor from the settled starch, and resuspending the starch in water and adding an acid to the resuspended material to establish the pH at about 4 to 6.

3. The method of claim 2 including washing the neutralized starch to reduce the gluten and ash content, the said suspension being maintained at all times at a temperature not substantially above 150° F.

4. In making modified corn starch characterized by clearness of its aqueous gel, the method which comprises treating the starch as described in claim 2, subjecting the treated starch to acid-thinning at a pH of approximately 1.5 to 2.5, adjusting the pH of the product to about 5 to 7, and washing and drying the product.

5. In making modified corn starch characterized by shortness, minimized stringiness, and clearness of its aqueous gel, the method which comprises treating corn starch in water with acid at a pH of about 1.5 to 2.5, to cause acid-thinning, and then treating the corn starch as described in claim 2.

RAYMOND E. DALY.
FREDERICK A. FRANKENFIELD.
HERMAN H. SCHOPMEYER.